July 28, 1925.
T. L. TALIAFERRO
1,547,468
MECHANISM FOR FORMING JAR BAND CLOSURES
Filed April 26, 1923    13 Sheets-Sheet 1
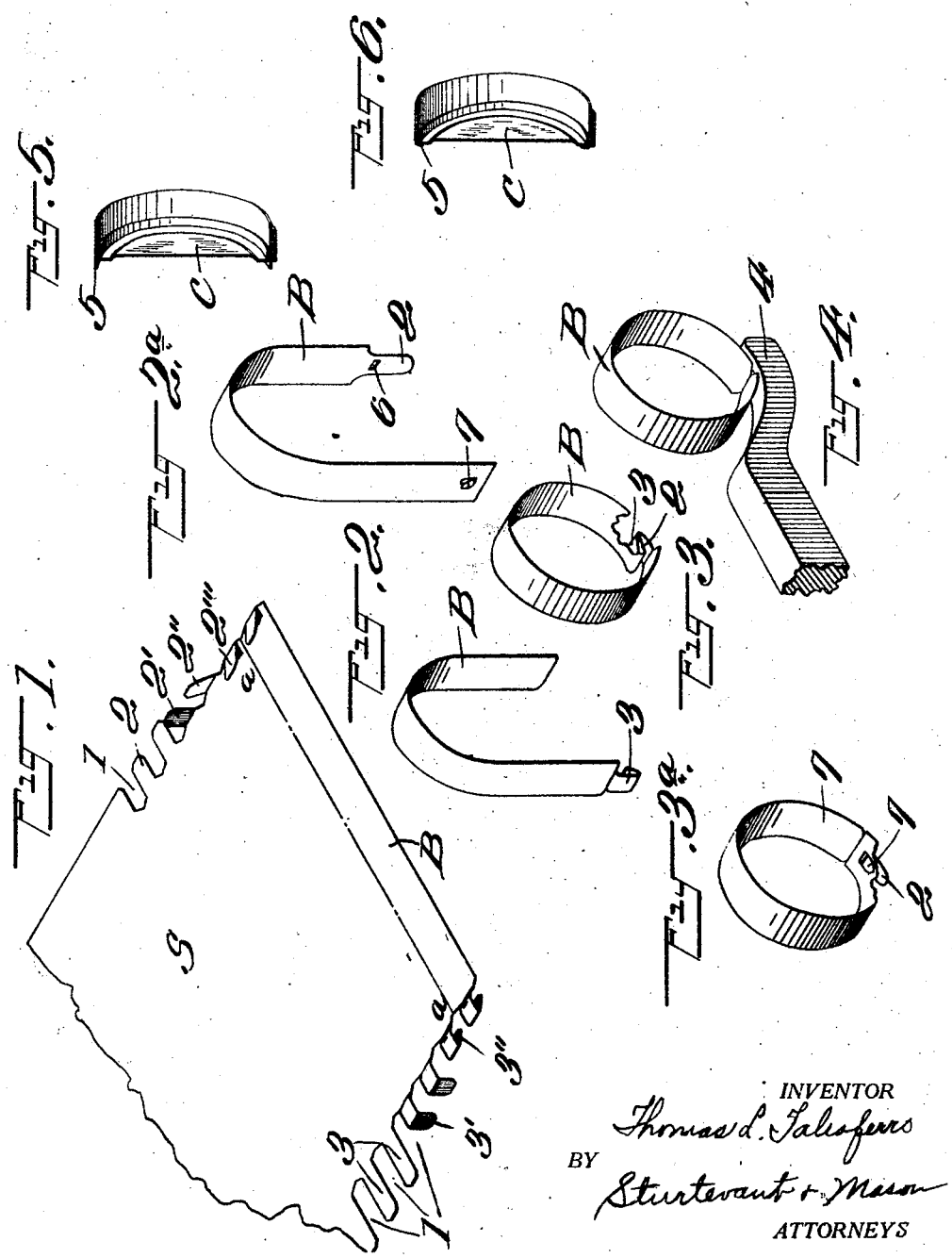
INVENTOR
Thomas L. Taliaferro
BY
Sturtevant + Mason
ATTORNEYS

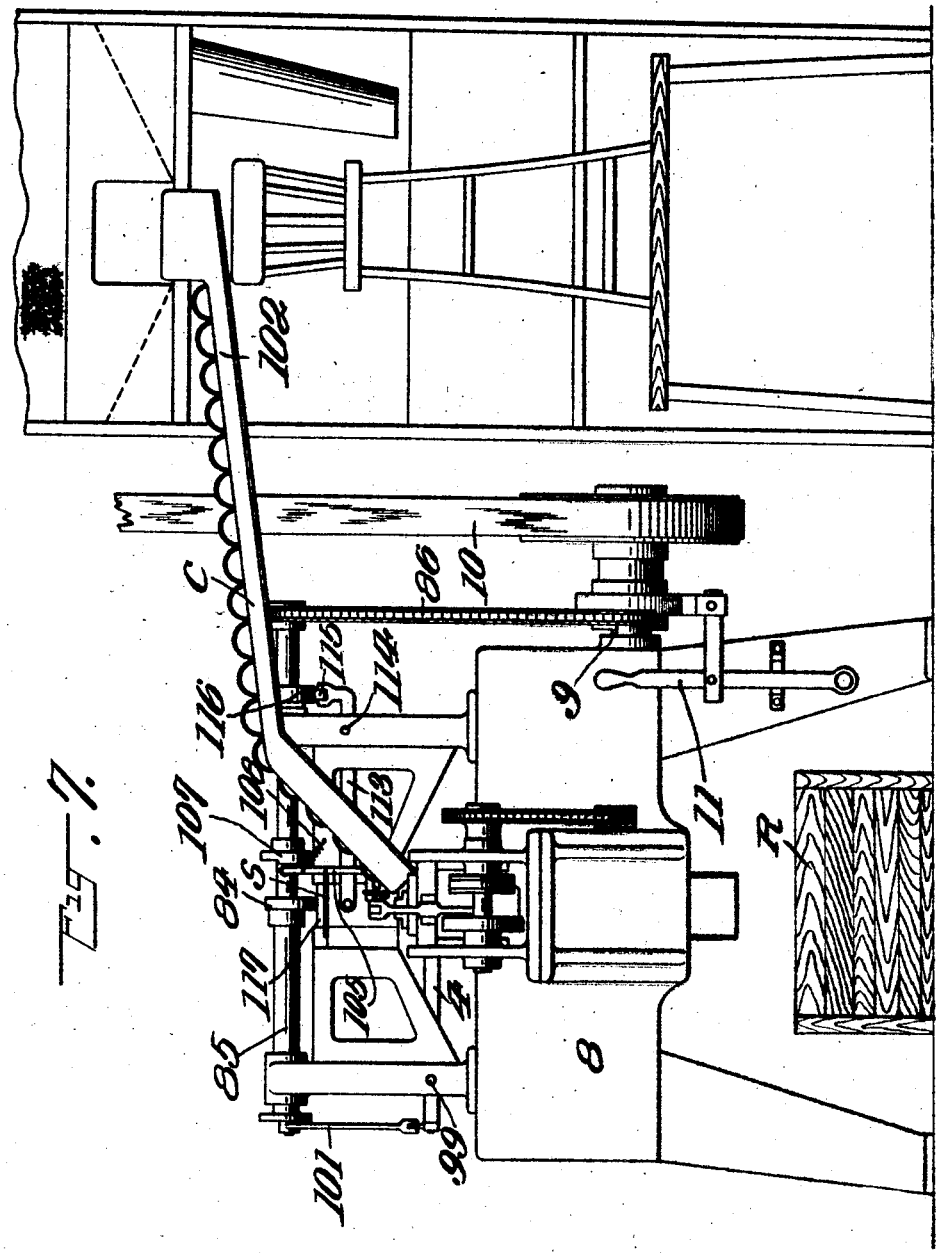

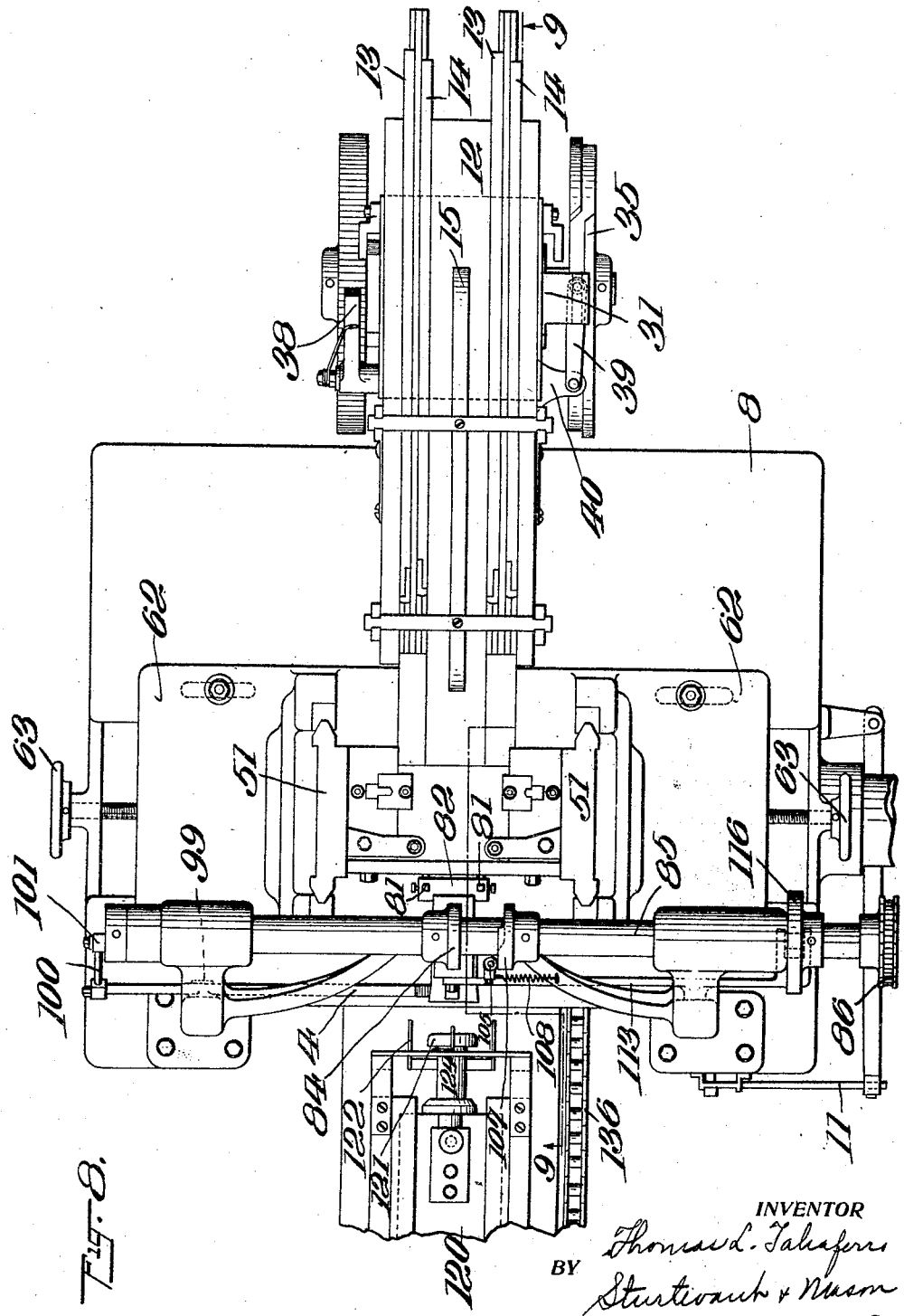

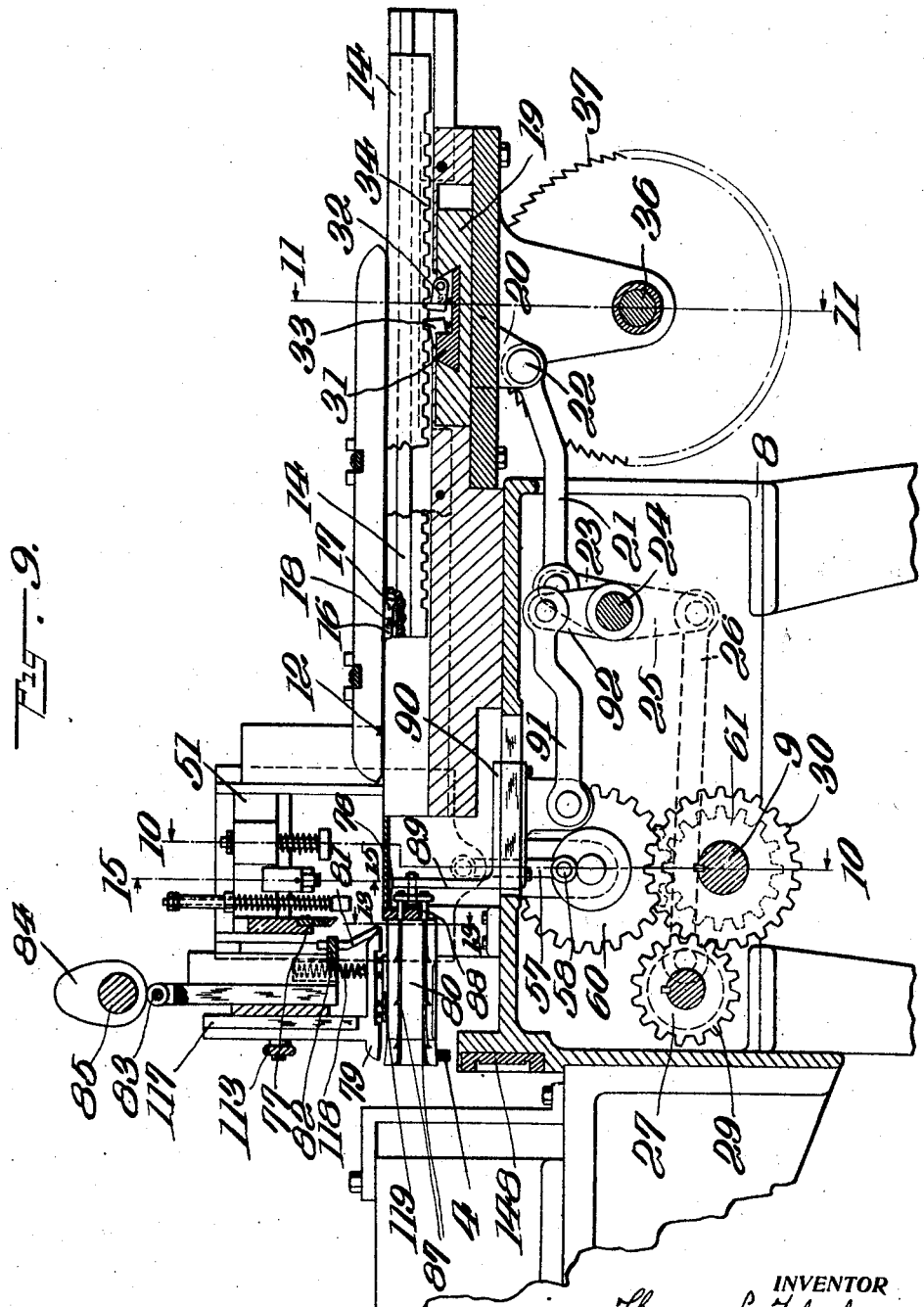

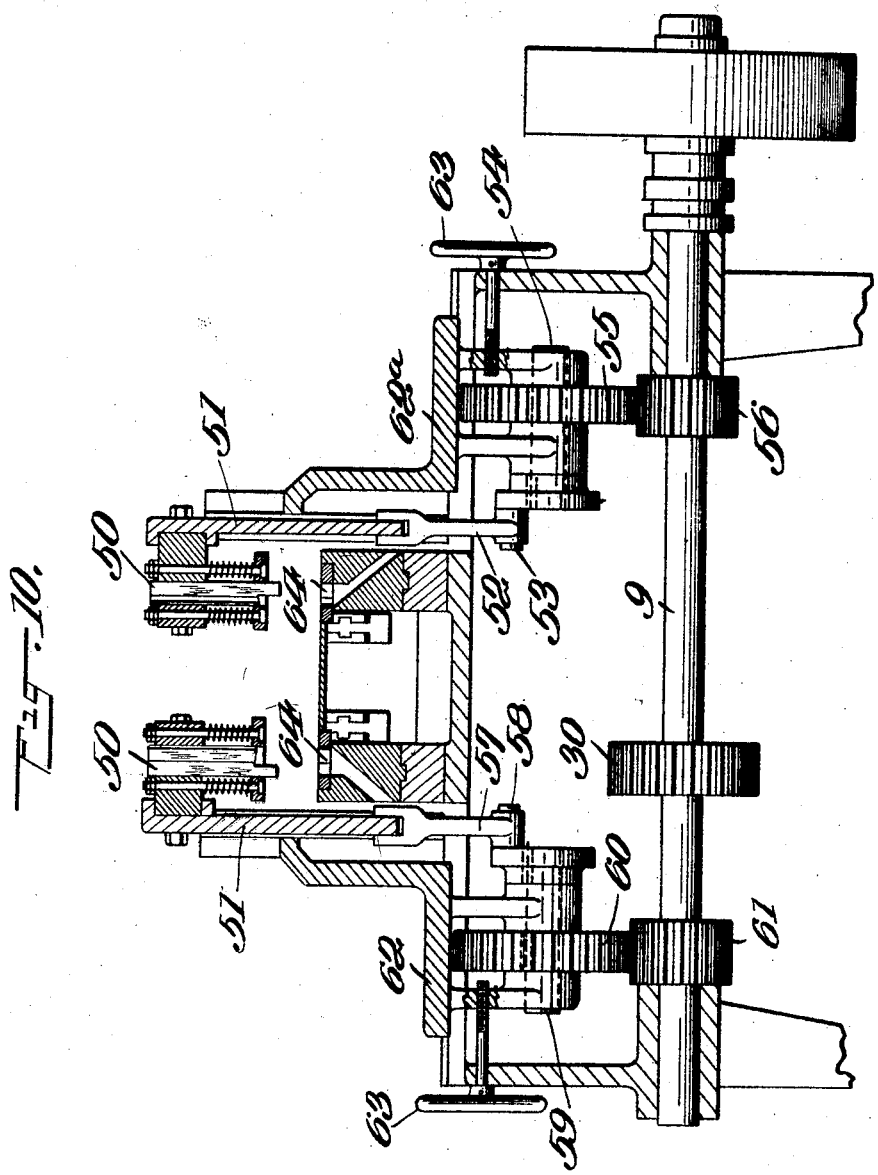

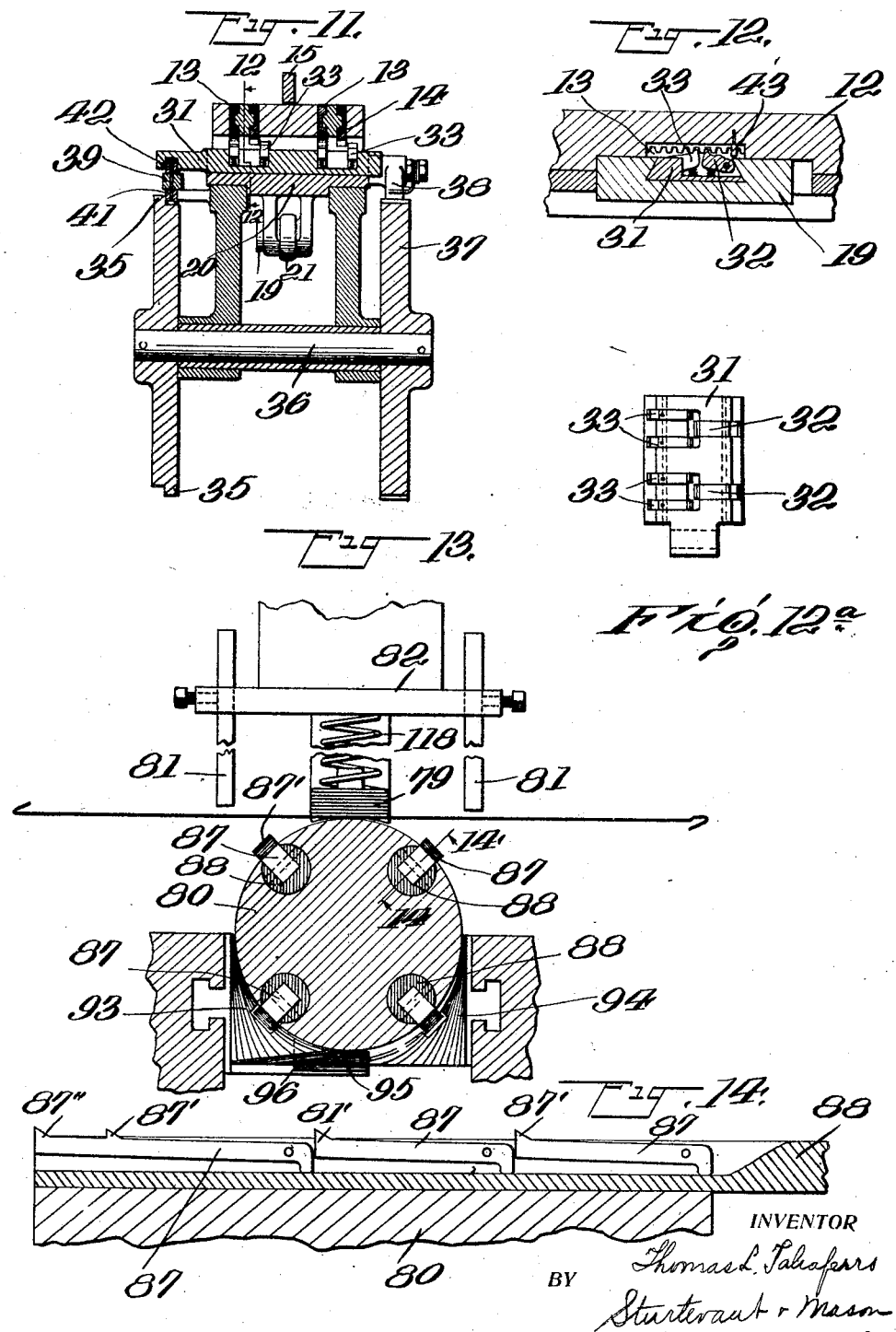

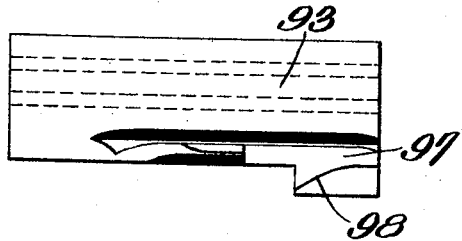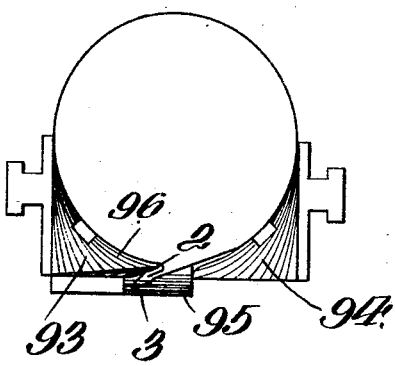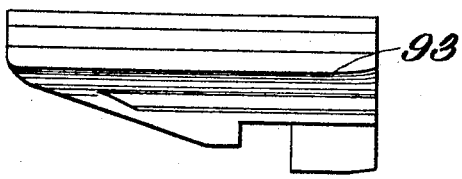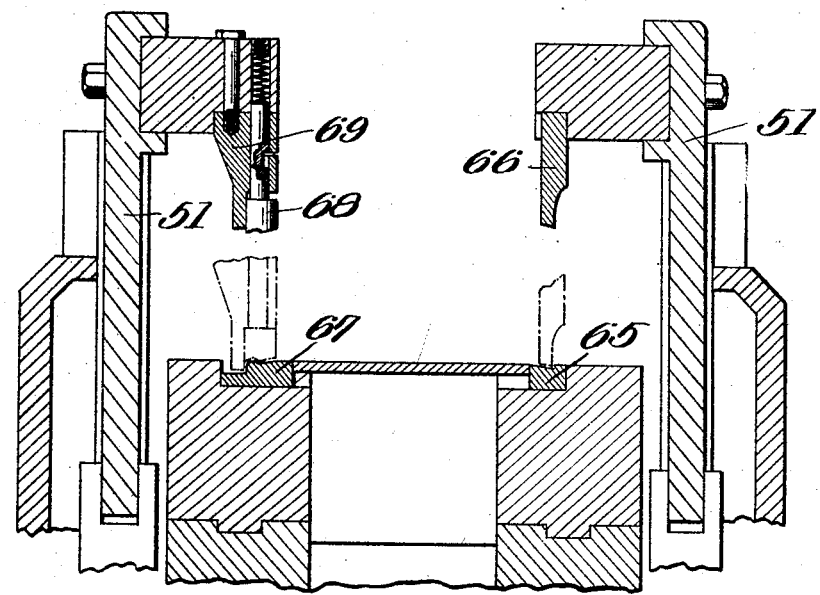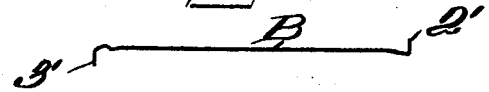

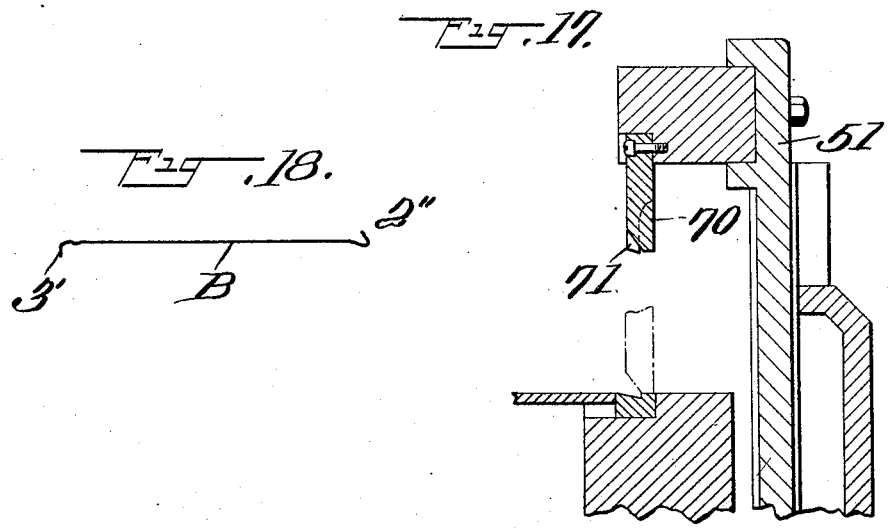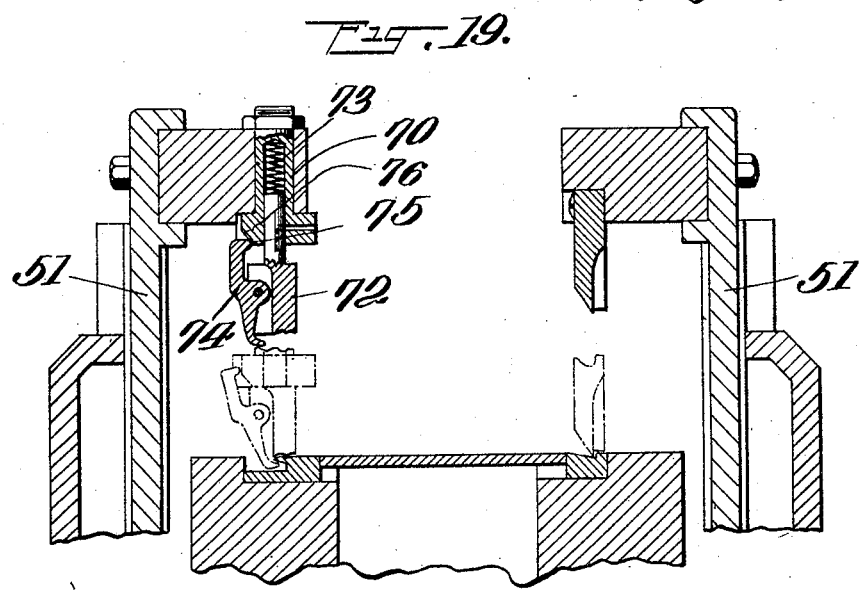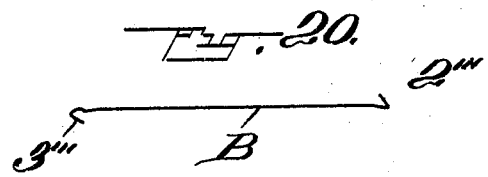

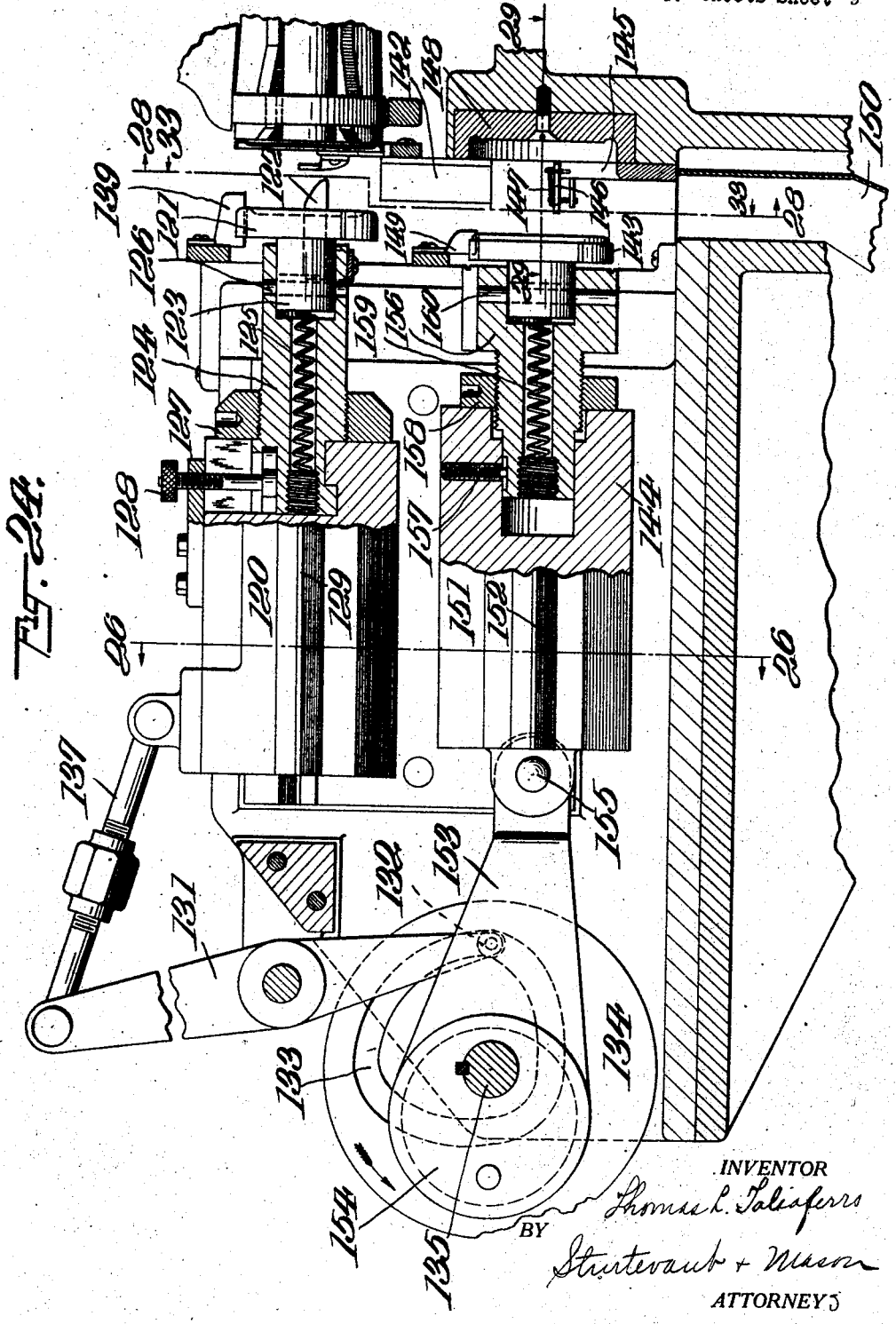

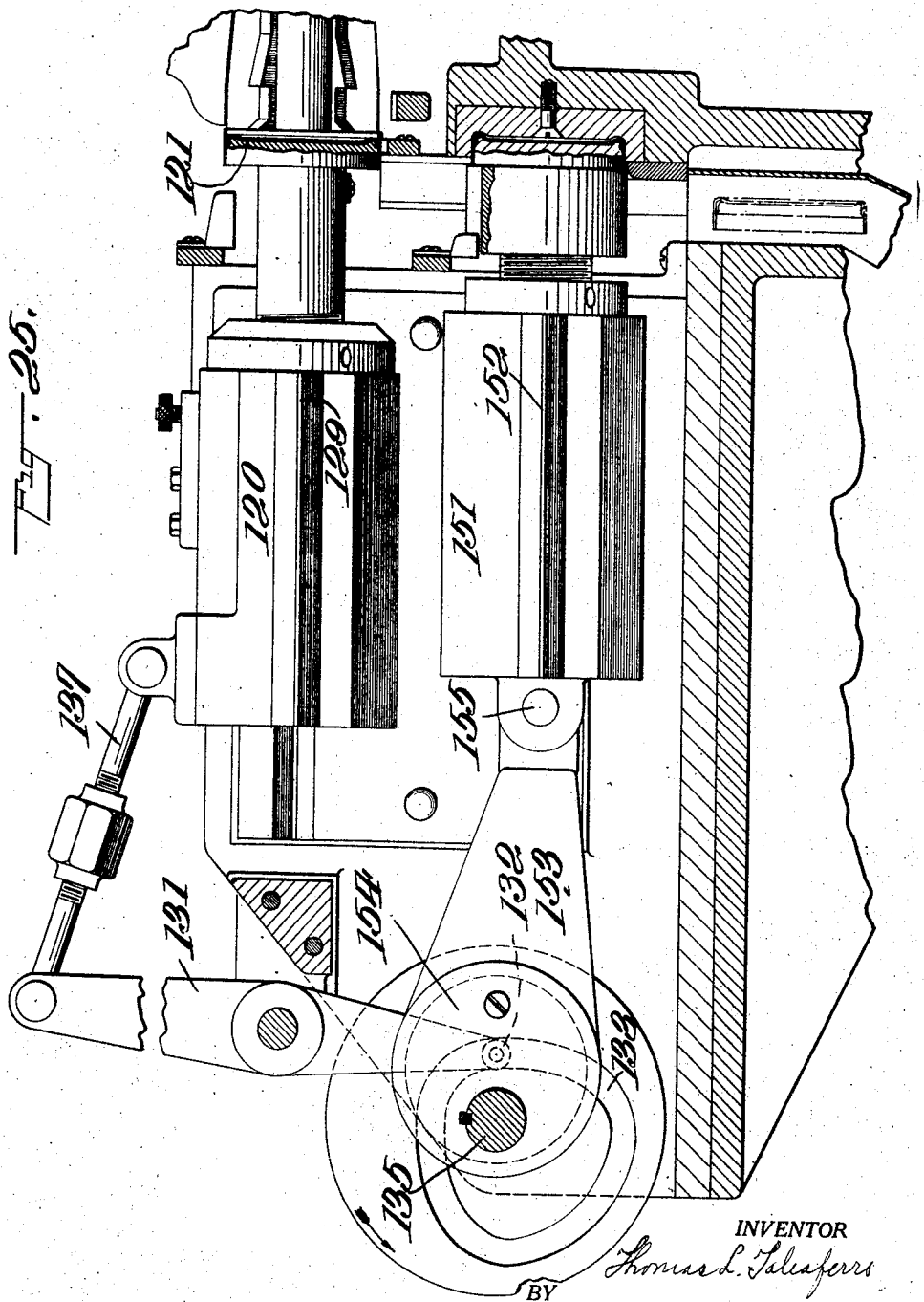

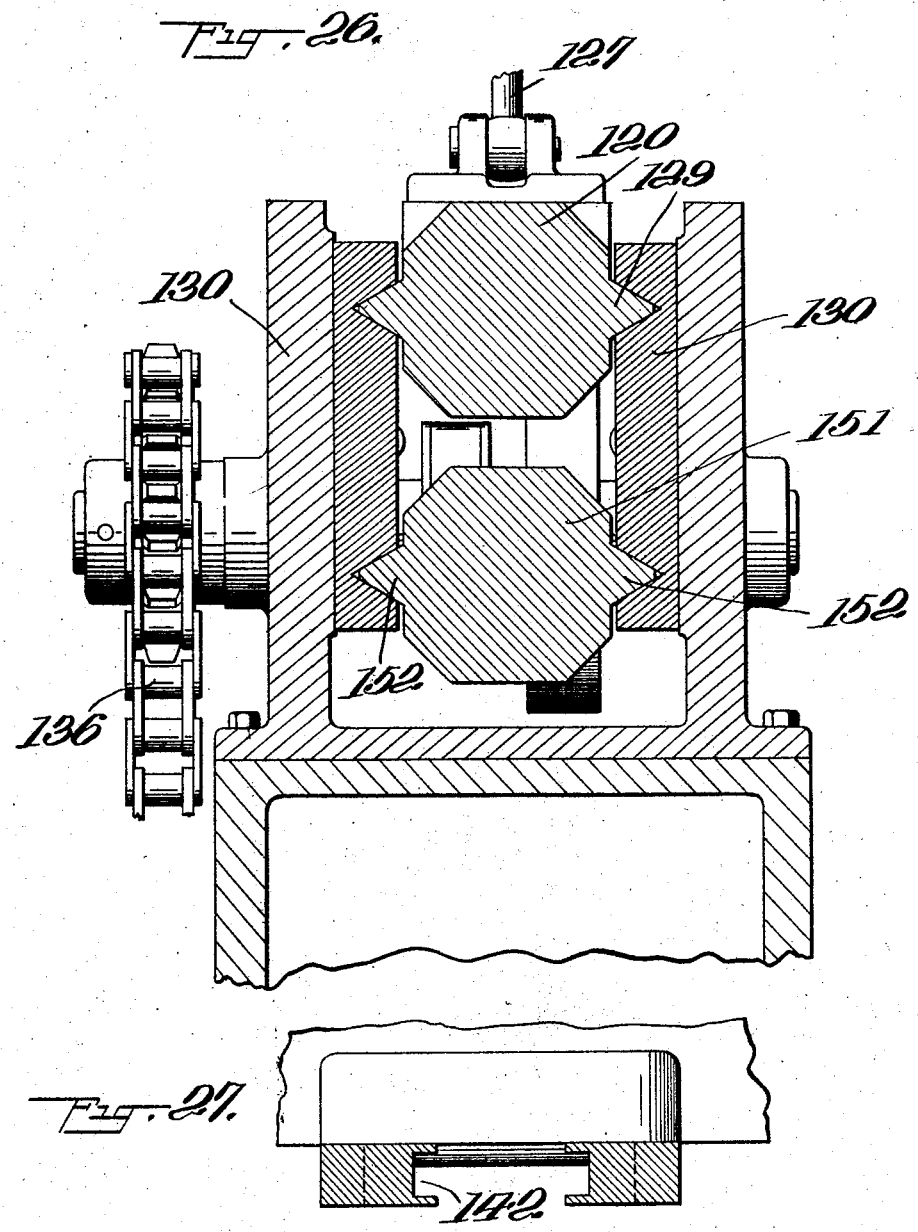

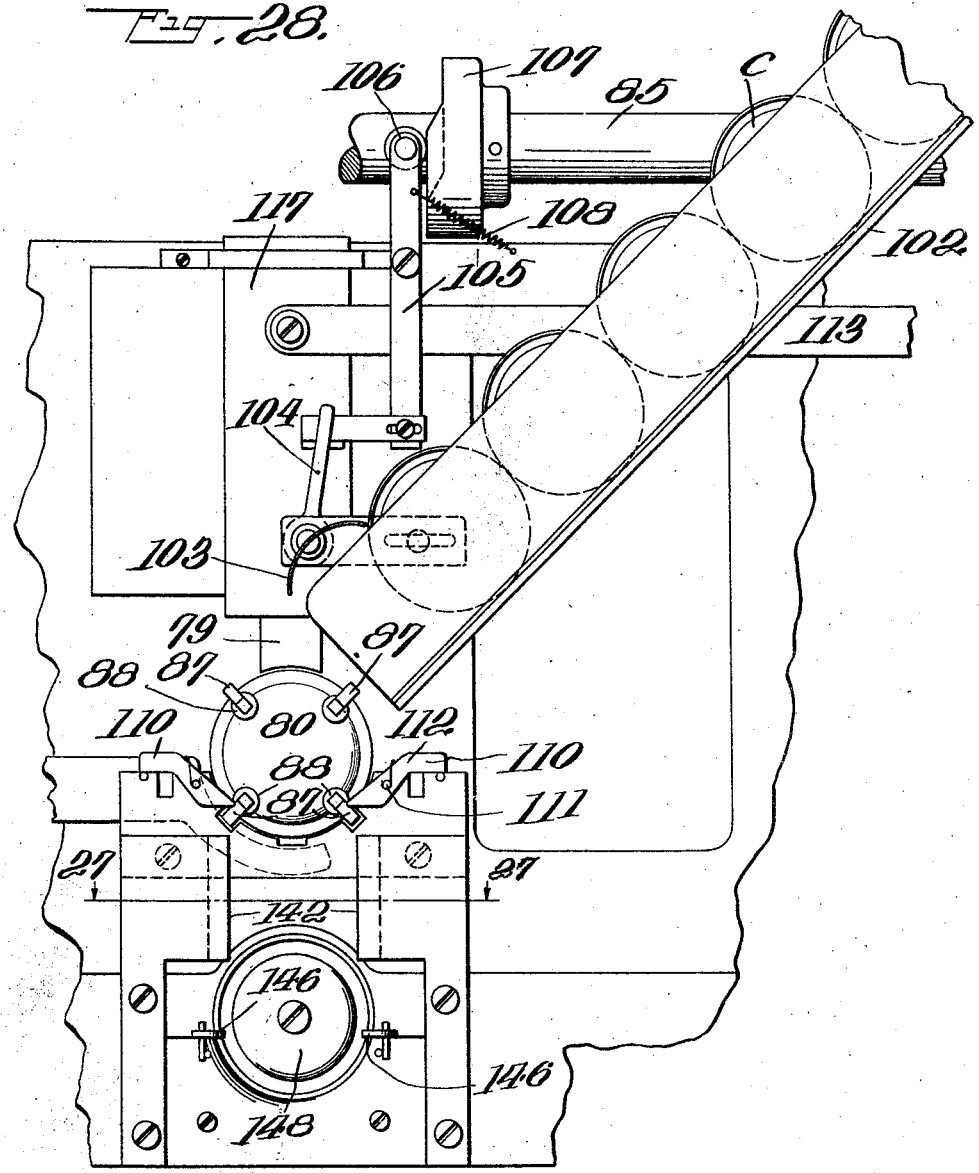

July 28, 1925.
T. L. TALIAFERRO
1,547,468
MECHANISM FOR FORMING JAR BAND CLOSURES
Filed April 26, 1923     13 Sheets-Sheet 13
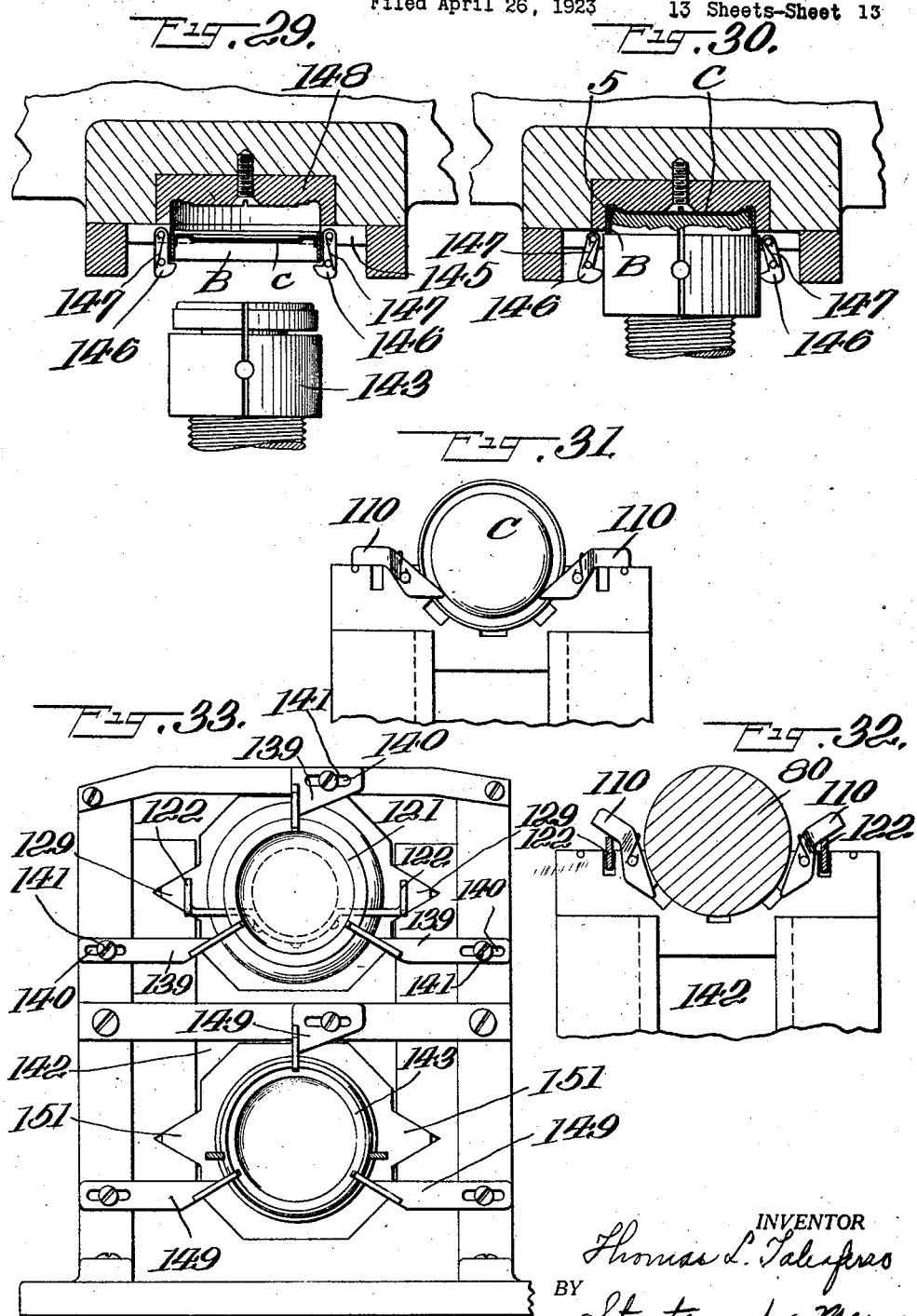

Patented July 28, 1925.

1,547,468

UNITED STATES PATENT OFFICE.

THOMAS L. TALIAFERRO, OF CHICAGO, ILLINOIS.

MECHANISM FOR FORMING JAR-BAND CLOSURES.

Application filed April 26, 1923. Serial No. 634,807.

*To all whom it may concern:*

Be it known that I, THOMAS L. TALIAFERRO, a citizen of the United States, residing at Chicago, in the county of Cook, State of Illinois, have invented certain new and useful Improvements in Mechanism for Forming Jar-Band Closures, of which the following is a description, reference being had to the accompanying drawing and to the figures of reference marked thereon.

The invention relates to new and useful improvements in an organized mechanism for forming a jar band closure, that is, a closure wherein the cap portion is secured to the jar by means of a band which is capable of being ruptured or parted readily in order to release the cap portion.

An object of the invention is to provide a mechanism wherein the cap portion is automatically assembled in the band after the band is formed, after which the cap portion is held and the flange on the band is turned over the cap portion as an anvil.

A further object of the invention is to provide a mechanism of the above type which also includes devices for forming the band and interlocking the ends thereof.

A still further object of the invention is to provide a mechanism of the above type wherein the ends of the band are shaped in the sheet of metal prior to the severing of the metal to form the band, after which the band is bent into cylindrical form and the ends interlocked, and then the cap portion is assembled in the band and the flange turned over on to the cap portion as above stated.

These and other objects will in part be obvious and will in part be hereinafter more fully disclosed.

In the drawings which show by way of illustration one embodiment of the invention—

Figure 1 is a perspective view of a sheet of metal showing the progressive steps in the forming of the band subsequent to the severing of the band strip from the sheet;

Fig. 2 is a perspective view showing the band bent into U-shape, which is the first step in the forming of the band after it is severed from the sheet;

Fig. 2$^a$ is a similar view but showing a slightly modified form of means for interlocking the ends of the band;

Fig. 3 is a perspective view showing the band in cylindrical form and the ends engaged ready for locking the same;

Fig. 3$^a$ is a view similar to Fig. 3, but showing a modified form of interlocking means;

Fig. 4 is a view similar to Fig. 3, but showing in addition, the anvil for pressing down the ends and locking the same;

Fig. 5 is a view partly in section and partly in perspective showing the band with the cap assembled therein preparatory to the turning over of the flange on to the cap;

Fig. 6 is a similar view, but showing the flange turned over on to the cap;

Fig. 7 is a view of the front of the machine and showing the relative arrangement of the operating parts therefor, and the manner of feeding the caps into the machine;

Fig. 8 is a plan view of a portion of the machine;

Fig. 9 is a sectional view on the line 9—9 of Fig. 8;

Fig. 10 is a sectional view on the line 10—10 of Fig. 9;

Fig. 11 is a sectional view on the line 11—11 of Fig. 9;

Fig. 12 is a sectional view on the line 12—12 of Fig. 11;

Fig. 12$^a$ is a plan view of the feeding pawls;

Fig. 13 is a sectional view on the line 13—13 of Fig. 9;

Fig. 14 is a sectional view on the line 14—14 of Fig. 13;

Fig. 15 is a sectional view on the line 15—15 of Fig. 9;

Fig. 16 is an edge view of the strip as shaped by the mechanism shown in Fig. 15;

Fig. 17 is a sectional view of one side of the machine and showing the means for further forming the hook at one end of the band;

Fig. 18 is an edge view of the band as shaped by the mechanism shown in Fig. 17;

Fig. 19 is a transverse sectional view through the mechanism for turning under the end of the band;

Fig. 20 is an edge view of the band as formed by the mechanism shown in Fig. 19;

Fig. 21 is an end view of the shaping members which complete the bending of the band and the interlocking of the ends;

Fig. 22 is a front view of the left-hand forming member as shown in Fig. 21;

Fig. 23 is a plan view of the forming member shown in Fig. 22;

Fig. 24 is a view partly in section and partly in side elevation of the assembling means for placing the cap in the band and for turning the flange on the band against the cap.

Fig. 25 is a view similar to Fig. 24, except certain of the parts are not sectioned, and showing the position of the parts when one cap is being placed in the band and another band is being turned over on to the cap;

Fig. 26 is a sectional view on the line 26—26 of Fig. 24;

Fig. 27 is a sectional view on the line 27—27 of Fig. 28;

Fig. 28 is a sectional view on the line 28—28 of Fig. 24;

Fig. 29 is a sectional view on the line 29—29 of Fig. 24;

Fig. 30 is a view similar to Fig. 29, but showing the flange turned on the band;

Fig. 31 is an end view showing the cap supporting means;

Fig. 32 is a view similar to Fig. 31, but showing the plunger and the releasing means for releasing the holding fingers, said fingers having been turned so as to release the cap, and Fig. 33 is a view on the line 33—33 of Fig. 24.

The invention consists broadly in the placing of a cap in a breakable band and the supporting of the cap after it is placed in the band, and then the turning of the edge of the band over on to the cap. I also prefer to provide my improved mechanism with means for forming the band from a sheet of metal and the inter-locking of the ends of the band, and finally, the assembling of the cap in the band and the turning of the flange of the band over on to the cap. I will describe the invention, therefore, in the completed form just referred to wherein the band is formed from a sheet of metal and the cap automatically assembled in the band and the band turned over on to the cap, thus completing the jar band closure ready for placing the same on the jar. Sheets of metal of suitable size are fed into the machine one after the other automatically. All the operator is required to do is to place the sheets, and at the proper time the sheets will be taken up by the feeding mechanism and carried forward step by step. As the sheet is moved step by step into the machine, the edges of the sheet are first notched to form the ends of the band and then in other operations, the formed ends are bent, one being bent upwardly and inwardly to form a hook, and the other being bent downwardly and inwardly to form a hook. The band is then severed from the sheet and as soon as it is severed from the sheet, it is bent around a horn into U-shape. It is then moved along the horn by suitable feeding devices, and the ends of the U-shaped member are turned underneath the horn, thus forming a cylindrical band and the hooks on the ends of the band are interengaged after which they are pressed down and locked. This completes the cylindrical band. At the same time, end caps are fed into the machine, and the end cap is fed directly in front of the formed band as it comes off from the horn, and said end cap is suitably supported so that the band is fed over the end cap and thus the end cap and band are assembled. After these parts have been assembled, they move to the next station, where a plunger moves into the band and against the end cap, and the parts are carried forward into a flanging die which will bend the flange of the band on to the cap as an anvil, thus completing the formation of the jar band closure.

It is thought that the invention will possibly be better understood by a detail description of the mechanism which I have provided for carrying out the various steps described above.

In Fig. 1 of the drawings, a sheet of metal indicated at S is trimmed to proper size and as it is fed step by step through the machine, notches 1, 1 are formed therein, thus providing the shaped ends 2 and 3 of the jar band. At a further step in the movement of the sheet, the end 2 is bent upwardly as indicated at 2', thence inwardly as indicated at 2'' and finally downwardly as indicated at 2'''. At the same time, the end 3 is bent downwardly as indicated at 3', thence inwardly as indicated at 3''. This completes the forming of the ends of the band, after which it is severed on the line $a$—$a$, thus completing the band indicated at B. The band indicated at B is then bent into U-shape as shown in Fig. 2, after which the ends 2 and 3 are interlocked and they are then presented to a bumper 4 which presses the interlocked ends down on to each other, thus forming an interlocked seam and completing the cylindrical band. The end cap indicated at C (see Fig. 5) is then placed in the cylindrical band with a portion of its edge 5 projecting beyond the upper face of the cap. This edge 5 is then turned over as shown in Fig. 6, thus completing the band. In Fig. 2ª, I have shown the band B as having an opening 6 in the end 2 and at the other end of the band there is a tongue 7 which is adapted to be inserted in the opening 6 as shown in Fig. 3 and pressed down, thus interlocking the parts. Both of these forms of the construction of the band are well known and will not need further description.

My improved mechanism for forming and assembling the bands and caps includes a supporting frame 8 in which is mounted a main shaft 9 adapted to be operated by a suitable belt 10 running on a belt wheel, there being the usual hand-operated clutch mechanism 11 for clutching up the shaft with the power mechanism. The sheets are placed on a feeding-in table 12 and are fed along said feeding-in table by reciprocating bars. There are preferably four bars arranged in pairs, two of which are operative to feed one sheet forward, while the other two are being returned preparatory to feeding in the next sheet. As shown in Fig. 8, the bars 13, 13 form one pair and the bars 14, 14 form the other pair. Midway between the sides of the table there is a presser bar 15 (see Figures 8 and 11), which holds the sheet against the table and insures that it will be properly fed forward by the feeding mechanism and also enables one sheet which is being fed to engage an advance sheet and finish the feeding movements of the advance sheet.

Each of these bars 13 and 14 is provided with a yieldingly mounted dog 16 (see Fig. 9). Each dog is pivoted at 17 and a spring 18 raises the front end of the dog so that it will engage the edge of the sheet to move it forward. It will be noted that the bars are located well toward the side edges of the sheet, so that the two dogs will insure that the sheet is moved forward evenly and to the same extent at its opposite edges.

As a means for moving these bars carrying the feed dogs, I have provided a reciprocating block 19 which is formed with depending brackets 20 and a link 21 is pivoted at 22 to these depending brackets. This link 21 is in turn pivoted to an arm 23 carried by a rock shaft 24. The rock shaft 24 in turn is formed with an arm 25 shown in dotted lines in Fig. 9, and this arm 25 is connected with a link 26 which is operated by a disk 27 carried by a shaft 28. The shaft 28 is provided with a gear wheel 29 which meshes with a gear wheel 30 on the main shaft 9. This mechanism imparts a back and forth movement to the reciprocating block 19. Mounted on this reciprocating block 19 is a dove-tailed plate 31. The dove-tailed plate 31 carries two dogs 32 and four dogs 33 (see Fig. 12ª). The dogs 32 are effective for moving the bars forward, while the dogs 33 are effective for moving the bars in a rearward direction. Each bar 13, 13 and 14, 14 is provided with a rack 34 on its under face and the dogs cooperate with these racks. The dove-tailed plate 31 is capable of endwise movement in the dove-tailed slot in the reciprocating block 19. Said dove-tailed plate is moved endwise by means of a cam wheel 35 mounted on a shaft 36 and the shaft 36 is moved step by step by means of a ratchet wheel 37 fixed thereto. The ratchet wheel 37 is stepped around by means of a spring pressed pawl 38 pivotally supported by the reciprocating block 19. At one side of the machine there is an arm 39 pivoted to a bracket 40, and this arm carries a roller 41 (see Fig. 11) which is adapted to engage the side face of the cam on the cam wheel 35. There is another roller 42 on this arm 39 which engages a recess in the dove-tailed plate 31, and thus it is that the dove-tailed plate is at each revolution of the cam wheel moved laterally so as to cause one set of dogs to be operated and then the other. The dogs are pivotally supported on the plate and movable therewith and are so positioned that when certain of the dogs are operated the other dogs are out of range of the feed bars with which they are associated. As clearly shown in Fig. 12, I have provided pins or stop fingers 43 which engage respectively the dogs 32.

The stroke of the reciprocating block is sufficient so as to move the feed pawl over two teeth in the rack bar. This stop pin, however, is arranged so as to hold the dogs 32 out of engagement with the rack bar until they have moved forward a distance of one tooth. In other words, the dogs 33 will move the rack bars rearwardly, that is, during their idle movement, the distance of two teeth for each reciprocation of the block 19, while the feed dogs 32 will only move the rack bars forward the distance of one tooth for each reciprocation of said block 19. The purpose of this faster movement of the feed bars while they are idle is as follows. A sheet of metal to form the bands is placed on the feeding-in table, in front of the pawls 17 carried by the rack bars.

As has been noted above, the feed dogs 33 move the rack bars outwardly. These feed dogs are so positioned as clearly shown in Fig. 11, so as to operate upon one or the other of the rack bars, but not on both. As shown in this figure, the rack bars 13, 13 are engaged by the pawls 33, and are being moved outwardly, while the rack bars 14, 14 are being engaged by the inner dogs 32 and move forwardly. This dog 32 is of sufficient width, and is so located as to engage either one or the other of the rack bars depending upon the position of the block 19. The dogs 33 will move the rack bars outwardly in a shorter time than the rack bars are moved inwardly by the dogs 32, so that there is a period of dwell when the rack bars reach the outer end of their reciprocation. The sheet as above noted, is placed on a table in front of the pawls carried by the rack bars. When the block 19 is shifted so as to bring the feed dogs which move the rack bars forwardly into engagement therewith, then the rack bars will move forward, bringing the pawls into engagement with the sheet, after which the sheet is moved forward step by step. The rack bars are so timed relative to the length of the sheet, that the new incoming sheet will engage the rear end of the sheet that is just finishing, so that the new sheet will operate to feed the finishing strokes of the sheet which is in advance thereof. Thus it is that the sheets are taken one at a time and are fed forward step by step so that the sheets are notched, the ends formed in the bands, and the bands finally severed from the sheets.

As the sheets are moved forward step by step, they are first presented to notching devices which operate to form notches in the side edges of the sheet. These notching devices are shown in section in Fig. 10, and consist of two punches 50, 50 mounted on reciprocating heads 51, 51, respectively. The reciprocating head 51 at one side of the machine is raised and lowered by means of a link 52 cooperating with a crank pin 53 on a shaft 54, which in turn is rotated by means of a gear 55 meshing with a gear wheel 56 on the main shaft. The reciprocating head 51 at the other side of the machine is raised and lowered by a link 57 which cooperates with a pin 58 on a shaft 59 carrying a gear 60 meshing with a gear wheel 61. It will be noted that the gear wheels and shafts which reciprocate the heads are mounted on members 62 and 62$^a$ which are capable of being moved laterally by hand screws 63 for the purpose of varying the distance between the dies. This provides an adjustment so that bands of different sizes can be formed on my improved machine. Cooperating with the punches 50, 50 are female members 64, 64, respectively. As the sheets move underneath the punches, the ends are notched as indicated in Fig. 1 of the drawings. The sheet is then moved forward another step by means of the feed dogs and reciprocating feed bars for the purpose of shaping the ends of the formed tongues at the ends of the band. At the next operative station, one end of the band is turned up and the other end of the band is turned down. This is accomplished by die forming members shown in Fig. 15. The tongue 2 of the band is fed over the forming die 65 and a forming tool 66 carried by the reciprocating head 51 engages the tongue and bands the outer end thereof to upright position as shown in Fig. 1 of the drawings. At the same time, there is a forming die 67 at the other side of the machine which forms a shoulder in the tongue and bends the end thereof downwardly. This is accomplished by a duplex forming tool consisting of a member 68 yieldingly mounted in the reciprocating head, and a member 69 rigidly carried thereby. The member 68 first contacts with the band and shapes the back from the extreme end thereof, after which the member 69 turns the end of the band down as clearly shown in Figures 15 and 16 of the drawings. The band is then progressed to the next station, where the end 2 is bent inwardly. In Fig. 17 of the drawings, I have shown the manner of accomplishing this. A tool 70 carried by the reciprocating head 51 engages the upstanding end and bends the same inwardly, the beveled face 71 operating to perform this function. At the next operative station, the hook 3 is turned underneath the end of the band and this is brought about by means of a forming tool which includes a yieldingly mounted member 72 which comes down against the end of the band and further movement of this member is thus limited, the spring 73 yielding. A finger 74 pivotally carried by the member 72 has its upper end 75 placed adjacent a cam 76. The cam 76 is fixed, and as the member 72 moves up on the head, this will cause the lower end of the finger to move to the right to the dotted line position shown in Fig. 19, and thus it is that the end of the hook is bent underneath to the position shown in Fig. 20. This completes the forming of the ends of the band, and the sheet is then forward another step, until it is brought to a position where a cutting knife 77 will sever the finished band from the sheet. The cutting member 77 is carried by the reciprocating head 51 (see Fig. 9). This shear cutting member 77 cooperates with a shear plate 78 on the bed of the machine. The band is fed underneath the presser member 79 which is arranged directly above a horn 80. The spaced fingers 81, 81 (see Fig. 13) engage the band at some distance from the center thereof and bends the same down around the horn into the U-shape form shown in Fig. 2 of the drawings. These fingers 81 are carried by a cross head 82 which is reciprocated by means of a roller 83 cooperating with a cam 84 carried by a shaft 85, and the shaft 85 is in turn operated by a sprocket chain 86 (see Fig. 7). The band after it is bent around the horn is fed along the horn by reciprocating feed dogs 87 carried by reciprocating rods 88 (see Fig. 13). There are four rods 88 and a series of dogs carried by each rod. These rods 88 are secured to a bracket 89 mounted on a reciprocating block 90. The block 90 is connected by a link 91 to an arm 92 on the rock shaft 24. The length of reciprocation of these rods 80 is greater than the length of reciprocation of the feed bars which feed the strip forward. The bands are now severed from the sheet and it is desirable to move the bands forward at greater speed so as to give time for the assembling of the end cap in the finished band. As the band is fed along the horn, it engages the forming plates 93 and 94 at opposite sides of the machine. These forming plates are shown in detail in Figures 13 and 21 to 23, inclusive. Each forming plate has a gradually tapering face which gradually turns the band to overlap the ends as clearly shown in Fig. 21. The forming plates are also provided with cooperating sections 95 and 96 which operate to engage the two hooked ends together. The forming member 93 has a guiding recess 97 which receives the hooked end of the band and directs it so that it will be entered by the hook at the other end of the band. Said forming member 93 also has a portion 98 which serves to guide the hooked end 3 of the band and raise it so it will be interlocked with the hooked end 2.

The bars 88 carrying the feed pawls 87 for moving the bands along the horn, run in grooves in the forming plates 93 and 94, as clearly shown in Fig. 13 of the drawings. The presser member 79 is raised and lowered by means of a lever 113. This lever is pivoted at 114 to the frame (see Fig. 7), and carries a roller 115 at its outer end which cooperates with a cam 116 on the shaft 85. The presser member 79 is carried by a reciprocating head 117, to which the lever 113 is attached (see Fig. 9). A spring 118 normally forces the presser member downwardly into engagement with the bands while the lever 113 raises the presser member. This is raised in timing with the reciprocation of the bars carrying the feed dogs 87 so as to permit the free feeding of the bands along the horn. An auxiliary presser member 119 carried on the under face of the presser member 79 is continuously in engagement with the bands passing beneath the same, bearing lightly thereon, so as to control the movement of the bands along the horn. It will be noted that the outer feed dog 87 has two teeth 87' and 87''. The purpose of this is as follows. The tooth 87' moves the band to a position where it is engaged by the bumper 4 which is raised against the inter-engaged ends and operates to press them together into flat interlocked engagement. This bumper 4 is pivoted at 99 (see Fig. 8), and is operated by means of a link 100 cooperating with a crank 101 on the shaft 85. The band is now complete and is ready to be fed off from the end of the horn. The feed dog tooth 87'' will operate to push the band off from the horn, but as the distance between the teeth 87'' and 87' is much less than the distance between the teeth 87' of the respective dogs, it will be noted that there is a short interval of time before the band will be engaged by the tooth 87'' and moved off from the end of the horn. This gives ample time for the placing of an end cap directly in front of the end of the horn and the backing of the same up by the chuck, so that when the cap is moved forward off from the end of the horn, it is moved over this end cap and on to the chuck as shown in Fig. 25.

The end caps are fed into a feed trough 102. This may be done by hand or automatically, and said end caps roll down this trough until they engage a stop member 103. This stop member 103 is adapted to be oscillated by means of an arm 104 and a swinging lever 105 which in turn carries a roller 106 cooperating with a face cam 107 on the shaft 85. A spring 108 holds the roller in contact with the cam. This is a convenient means of releasing the end caps one at a time. It will be understood, of course, that other means may be utilized for this purpose if desired. The end cap when it drops from the trough or chute 102 will fall in behind retaining fingers 110. Each of these retaining fingers is pivoted at 111 and is held by means of springs 112 in raised position so as to retain the end caps on their seats (see Fig. 28). The end caps as above noted, are now directly in front of the horn on which the bands are formed.

Mounted on the frame of the machine is a reciprocating head 120 on which is mounted a chuck 121. This head is timed so as to move forward and clamp the end cap against the end of the horn and hold the same there while the feed dogs are feeding the band over the end cap and on to the chuck 121 (see Fig. 25). In Fig. 24, the end cap is placed against the end of the horn and is held there by the retaining fingers 110 preparatory to the chuck moving forward to engage the end cap. Mounted on the head carrying the chuck 121 are cam fingers 122. These cam fingers have their upper edges inclined, and are so positioned as to move underneath the outer ends of the retaining fingers, as clearly shown in Fig. 32 of the drawings. The cam fingers projecting in front of the chuck will engage the tail end of these fingers and swing the fingers on their pivots so as to get them out of the way of the chuck as the chuck moves up into engagement with the end cap.

The chuck 121 is mounted on a cylindrical supporting stem 123, and this stem is yieldingly mounted in a carrier 124 adjustably connected to the reciprocating head 120. A spring 125 in back of the cylindrical member 123 normally forces the same forward, and its forward movement is limited by a pin 126.

This makes a slight yielding support for the chuck to prevent breaking of the parts, provided the end cap becomes misplaced. The carrier 124 is shiftable in the head 120 and is secured in its endwise shifted position by means of a nut 127. This carrier can also be raised and lowered by means of an adjusting bolt 128. This is for the purpose of properly setting the chuck 121.

The head 120 is provided with V-shaped fins 129 which engage similar shaped grooves in guide plates 130 carried by a portion of the frame of the machine. The head is moved back and forth by means of a lever 131, which carries a roller 132 running in a cam groove 133 in a cam disk 134 mounted on a shaft 135. This shaft 135 is driven by a sprocket chain 136 which runs over a sprocket wheel on the main shaft 9. A link 137 connects the upper end of the lever 131 with the reciprocating head 120.

The chuck 121 is moved forward in engagement with the end cap, then the band is forced over the end cap and on to the chuck, after which the chuck is retracted. There are stripper plates 139 mounted on the frame of the machine so that they are fixed against movement, and these stripper plates work in slots in the chuck as clearly shown in Fig. 33. As shown in this figure, there are three of these stripper plates 139 and they are each slotted at 140 and secured by a screw 141 in set position. As the chuck 121 carrying the band with the cap placed therein moves to the left as viewed in Fig. 24, the stripper plates will strip the band and cap from the chuck and it will drop into the guide channel 142. This guide channel is shown in detail in Fig. 27. It is also clearly shown in Figures 32 and 33.

The next operation upon the assembled cap and band is to turn the side edge of the band over on to the cap, thus forming a flange. This flange serves as a means for drawing the cap down on to the jar. This flanging of the band is accomplished at a second station. The channel 142 directs the assembled band and cap to this flanging station. At the flanging station there is another chuck 143 which is carried by a reciprocating head 144. The band and assembled cap, when they reach the flanging station, rest on a ledge 145 and are held thereon by means of swinging latch fingers 146, 146 (see Fig. 29). Each finger is moved to a position to engage the band by means of a spring 147. The outer ends of these latch fingers are cam-shaped. When the chuck moves forward, the extreme end of the chuck engaging the latch fingers, will move the latch fingers outwardly so that the chuck can enter the band as clearly shown in Fig. 30. The chuck carries the band and assembled cap forwardly into the die 148 and this die is shaped so as to turn the band to form the flange 5 which overlaps the end cap. The chuck 143 is then retracted, carrying with it the band and cap, and stripper plates 149 carried by the frame of the machine and operating in slots or grooves in the sides of the chuck 143, strip the completed cap and band from the chuck and it drops into the chute 150. The chuck 143 is carried by a reciprocating head 151, which is provided with V-shaped fins 152 adapted to slide in similarly shaped guideways in the frame. The head is moved back and forth by means of an eccentric strap 153 cooperating with an eccentric 154 on the shaft 135. Said eccentric strap is pivoted at 155 to said reciprocating head. The chuck 143 is yieldingly mounted in the carrier member 156. This carrier member 156 is mounted in a reciprocating head so that it can be adjusted endwise therein and is held in adjusted position by means of a set screw 157 and a nut 158 threaded on to the shank of the carrier member. The chuck 143 has a cylindrical shank which can slide in a recess in the carrier member, and a spring 159 backs up this chuck so that it can yield if for any reason the end cap and band get misplaced in the die. A pin 160 limits the movement of the chuck.

It will be noted that the reciprocating heads are timed so that the chuck 121 and chuck 143 reach their forward travel at substantially the same time as clearly shown in Fig. 25. The chuck 121 remains at a dwell for a short period of time owing to the shaping of the cam groove 133, and this allows the band to be forced over the chuck. The chuck 143 is, however, retracted after the flange has been turned, and the end cap is stripped therefrom. The length of stroke of the chuck 143 is greater than that of the chuck 121 and this, together with the early movement of the chuck 143, insures that said chuck will be withdrawn so that the end cap and band which have been assembled in the upper station, can readily drop to the lower station ready to receive the chuck 143 on its next inward movement.

It is thought that the operation of the machine will be obvious from the detail description given above. The sheets are placed one after another by the operator on the feeding-in table and the machine at the proper time will pick up the sheet and feed it forward step by step. The sheet as it is advanced will be notched, and the ends of the band properly shaped for interlocking, after which a band will be cut from the sheet. This band as it is cut from the sheet is bent around the horn, and the ends are interlocked as it is fed step by step along the horn. One sheet is used to secure the finishing step movements of the sheet in advance thereof, so that each sheet is completely cut into bands, the sheets, of course, being of proper length to cut a certain number of bands. The end caps are likewise placed in the machine and are automatically fed one at a time as desired. These end caps drop first into the assembling station, where the finished band with the ends interlocked is forced over the end cap on to a chuck which supports the same, and this chuck moving outwardly carries the band and assembled end cap to a point where it is stripped from the chuck and then drops into the guide channel which directs the assembled cap and band to the next station. At this station, the second chuck moving into the band carries the band and end cap forward into the flanging die, which turns the edge of the band over on to the cap, thus completing the band and cap ready to be applied to a jar. After the flange is turned, the assembled band and cap are withdrawn from the die by the chuck, and are stripped from the chuck, and drop into the chute which carries the same to a suitable receptacle indicated at R (see Fig. 7).

It will also be noted that the machine may be readily adjusted for different sized bands and end caps as has been described in connection with the detail description of the parts.

While I have described in more or less detail the specific mechanism which I prefer to use in the automatically making of bands and the assembling of the end caps therein, and the turning of the bands on to the end cap, it will be understood, of course, that these details may be widely varied. My invention is directed more particularly to the sequence of operation and the arrangement of mechanical devices for automatically carrying out these steps, than to the particular way in which each operation is accomplished. It is also obvious that certain of the features of the machine are adapted to be used independently of other features. The invention which is sought to be covered by the patent is pointed out in the claims appended hereto.

Having thus described the invention, what I claim as new and desire to secure by Letters-Patent, is—

1. A jar band forming an assembled machine comprising means for feeding a sheet of metal step by step, means for severing the band from the sheet, means for bringing the formed ends of the band together and locking the same, means for forming an end cap, means for feeding the band after the ends are locked over the end cap, and means for supporting the assembled band and end cap and turning a flange in the band against the end cap.

2. A jar band forming and assembling machine comprising means for feeding the sheet of metal step by step, means for forming the ends of the band in the sheet, means for severing the band from the sheet, a horn, means for bending the band about the horn, means for moving the band step by step along the horn, means for bumping the ends of the band together after they are interlocked, means for placing an end cap at the end of the horn and for feeding the band after the ends have been bumped together off from the horn over the end cap, and means for supporting the assembled end cap and band and turning a flange on the band against the end cap.

3. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, and means for raising the presser member to permit the movement of the band, said presser member having yielding means continually bearing against the bands as they move along the horn, means for placing an end cap at the end of the horn and for feeding the band with the ends bumped together over the end cap.

4. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, means for raising the presser member to permit the movement of the band, said presser member having yielding means continually bearing against the bands as they move along the horn, means for placing an end cap at the end of the horn and for feeding the band with the ends bumped together over said end cap, and means for supporting the assembled end cap and band and turning a flange on the band against the end cap.

5. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, means for raising the presser member to permit the movement of the band, said presser member having yielding means continually bearing against the bands as they move along the horn, means for placing the end cap in front of the horn, and a chuck adapted to hold said end cap against the end of the horn whereby the band as it is fed off from the end of the horn will pass over the end cap on to the chuck.

6. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, means for raising the presser member to permit the movement of the band, said presser member having yielding means continually bearing against the bands as they move along the horn, means for placing the end cap in front of the horn, a chuck adapted to hold said end cap against the end of the horn whereby the band as it is fed off from the end of the horn will pass over the end cap on to the chuck, means for stripping the assembled band and end cap from the chuck, and means for supporting the end cap and for turning a flange in the band against the end cap.

7. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, means for raising the presser member to permit the movement of the band, said presser member having yielding means continually bearing against the bands as they move along the horn, a chuck located in front of the end of the horn, means for moving the chuck toward and from the horn and giving the chuck a dwell when adjacent the horn, means for feeding an end cap between the chuck and the end of the horn whereby the end cap is held by the chuck and a band fed over the end cap on to the chuck, and means for stripping the assembled band and end cap from the chuck when it is moved away from the horn.

8. A jar band forming and assembling machine comprising means for feeding the sheet of metal step by step, means for forming the ends of the band in the sheet, means for severing the band from the sheet, a horn, means for bending the band about the horn, means for interlocking the ends of the band, means for bumping the ends of the band together, means for moving the band step by step along the horn, a presser member adapted to engage the band on the horn, means for raising the presser member to permit the movement of the band, said presser member having yielding means continually bearing against the bands as they move along the horn, a chuck located in front of the end of the horn, means for moving the chuck toward and from the horn and giving the chuck a dwell when adjacent the horn, means for feeding an end cap between the chuck and the end of the horn whereby the end cap is held by the chuck and a band fed over the end cap on to the chuck, means for stripping the assembled band and end cap from the chuck when it is moved away from the horn, a second chuck adapted to move into the band, a die member, and means for moving said second chuck with the band thereon into the die member whereby a flange is turned in the band on to the end cap.

9. A jar band forming and assembling machine comprising means for feeding the sheet of metal step by step, means for forming the ends of the band in the sheet, means for severing the band from the sheet, means for bringing the formed ends of the band together and for interlocking the same, a chuck adapted to support an end cap, means for feeding the band with the ends interlocked over the chuck and the end cap supported thereby, means for stripping the assembled band and end cap from the chuck, a second chuck adapted to enter said band, a die member cooperating therewith, whereby when said second chuck moves the band and end cap into the die member, the edge of the band will be formed into a flange bearing against the end cap, and means for stripping the band and end cap from said second chuck.

10. A jar band forming and assembling machine comprising means for feeding the sheet of metal step by step, means for forming the ends of the band in the sheet, means for severing the band from the sheet, a horn, means for bending the band about the horn and for interlocking the ends of the band, means for feeding the bands step by step along said horn, a chuck directly in front of the end of the horn, means for moving said chuck toward and from the end of the horn and giving a dwell thereto when near the horn, means for feeding an end cap between the chuck and the end of the horn whereby said end cap is held by the chuck so that the band may be fed over the same on to the chuck, and means for stripping the band and end cap from the chuck.

11. A jar band forming and assembling machine comprising means for feeding the sheet of metal step by step, means for forming the ends of the band in the sheet, means for severing the band from the sheet, a horn, means for bending the band about the horn and for interlocking the ends of the band, means for feeding the bands step by step along said horn, a chuck directly in front of the end of the horn, means for moving said chuck toward and from the end of the horn and giving a dwell thereto when near the horn, means for feeding an end cap between the chuck and the end of the horn whereby said end cap is held by the chuck so that the band may be fed over the same on to the chuck, means for stripping the band and end cap from the chuck, a second chuck adapted to enter said band, and a die member cooperating with said second chuck whereby a flange is turned in the band on to the end cap.

12. A jar band forming and assembling machine comprising means for feeding the sheet of metal step by step, means for forming the ends of the band in the sheet, means for severing the band from the sheet, a horn around which the band is formed and the ends interlocked, means for feeding the band step by step along the horn including reciprocating bars carrying pivoted feed dogs, a presser member bearing on the bands, means for raising and lowering the presser member, said presser member having a yielding section adapted to continually engage the bands passing underneath the same, and a bumper for bumping down the interlocked ends of the bands prior to the band being fed off from the end of the horn and means for supporting the end cap at the end of the horn whereby the band with the interlocked ends when fed off the horn will be fed over said end cap.

13. A jar band forming and assembling machine comprising means for feeding the sheet of metal step by step, means for forming the ends of the band in the sheet, means for severing the band from the sheet, a horn around which the band is formed and the ends interlocked, means for feeding the band step by step along the horn including reciprocating bars carrying pivoted feed dogs, a presser member bearing on the bands, means for raising and lowering the presser member, said presser member having a yielding section adapted to continually engage the bands passing underneath the same, a bumper for bumping down the interlocked ends of the bands prior to the band being fed off from the end of the horn, a chuck at the end of the horn adapted to receive said band as it is fed off from the horn, means for placing an end cap between the chuck and the horn so that the band is fed over the end cap on to the chuck, and means for stripping the assembled band and end cap from the chuck.

14. A jar band forming and assembling machine comprising means for feeding the sheet of metal step by step, means for forming the ends of the band in the sheet, means for severing the band from the sheet, a horn around which the band is formed and the ends interlocked, means for feeding the band step by step along the horn including reciprocating bars carrying pivoted feed dogs, a presser member bearing on the bands, means for raising and lowering the presser member, said presser member having a yielding section adapted to continually engage the bands passing underneath the same, a bumper for bumping down the interlocked ends of the bands prior to the band being fed off from the end of the horn, a chuck at the end of the horn adapted to receive said band as it is fed off from the horn, means for placing an end cap between the chuck and the horn so that the band is fed over the end cap on to the chuck, means for stripping the assembled band and end cap from the chuck, a second chuck adapted to enter said band, and a die cooperating with said second chuck for turning the edge of the band over on to the end cap.

15. A jar band forming and assembling machine comprising a horn, means for bending the bands about the horn and interlocking the ends thereof, means for bumping down the interlocked ends, means for feeding the bands step by step along the horn, a chuck at the end of the horn, means for moving the chuck toward and from the end of the horn and giving a dwell thereto adjacent the end of the horn, means for placing an end cap between the chuck and the end of the horn, said means including pivoted dogs adapted to be moved out of the way of the chuck as it moves forward whereby the band may be moved off from the horn over the end cap on to the chuck, and means for stripping the assembled band and end cap from the chuck.

16. A jar band forming and assembling machine comprising a horn, means for bending the bands about the horn, and interlocking the ends thereof, means for bumping down the interlocked ends, means for feeding the bands step by step along the horn, a chuck at the end of the horn, means for moving the chuck toward and from the end of the horn and giving a dwell thereto adjacent the end of the horn, means for placing an end cap between the chuck and the end of the horn, said means including pivoted dogs adapted to be moved out of the way of the chuck as it moves forward whereby the band may be moved off from the horn over the end cap on to the chuck, means for stripping the assembled band and end cap from the chuck, a second chuck, a die member cooperating therewith, pivoted dogs for supporting the assembled band and end cap in front of the die member, said dogs being constructed so that the chuck as it moves forward into the band will release the dogs, and means for stripping the band and end cap from the second chuck after a flange has been turned thereon.

17. A jar band forming and assembling machine comprising a horn, means for bending the bands about the horn, means for feeding the bands step by step along the horn including reciprocating bars, and pivoted feed dogs carried thereby, a presser member for controlling the movement of the bands along the horn, means for bumping the ends of the band, a chuck in front of the end of the horn, means for moving the chuck toward and from the horn and giving a dwell thereto when adjacent the end of the horn, means for placing an end cap between the chuck and the end of the horn, said feed dogs at the end of the horn being spaced so as to have an idle movement to give ample time to place the end cap between the chuck and the end of the horn before the band is fed off from the end of the horn on to the end cap and chuck, and means for stripping the assembled band and end cap from the chuck.

18. A jar band forming and assembling machine comprising a horn, means for bending the bands about the horn, means for feeding the bands step by step along the horn including reciprocating bars, and pivoted feed dogs carried thereby, a presser member for controlling the movement of the bands along the horn, means for bumping the ends of the band, a chuck in front of the end of the horn, means for moving the chuck toward and from the horn and giving a dwell thereto when adjacent the end of the horn, means for placing an end cap between the chuck and the end of the horn, said feed dogs at the end of the horn being spaced so as to have an idle movement to give ample time to place the end cap between the chuck and the end of the horn before the band is fed off from the end of the horn on to the end cap and chuck, means for stripping the assembled band and end cap from the chuck, pivoted retaining means for supporting the end cap in front of the chuck, and means movable with the chuck for engaging and moving said pivoted retaining members out of the way so that the end cap may be supported against the end of the horn.

19. A jar band forming and assembling machine comprising a horn, means for bending the bands about the horn, means for feeding the bands step by step along the horn including reciprocating bars, and pivoted feed dogs carried thereby, a presser member for controlling the movement of the bands along the horn, means for bumping the ends of the band, a chuck in front of the end of the horn, means for moving the chuck toward and from the horn and giving a dwell thereto when adjacent the end of the horn, means for placing an end cap between the chuck and the end of the horn, said feed dogs at the end of the horn being spaced so as to have an idle movement to give ample time to place the end cap between the chuck and the end of the horn before the band is fed off from the end of the horn on to the end cap and chuck, means for stripping the assembled band and end cap from the chuck, pivoted retaining means for supporting the end cap in front of the chuck, means movable with the chuck for engaging and moving said pivoted retaining members out of the way so that the end cap may be supported against the end of the horn, a second chuck adapted to enter the band, and a flanging die adapted to cooperate with said second chuck in turning the flange on the band on to the end cap.

20. A jar band forming and assembling machine comprising a horn, means for bending the bands about the horn, means for feeding the bands step by step along the horn including reciprocating bars and pivoted feed dogs carried thereby, a presser member for controlling the movement of the bands along the horn, means for bumping the ends of the band, a chuck in front of the end of the horn, means for moving the chuck toward and from the horn and giving a dwell thereto when adjacent the end of the horn, means for placing an end cap between the chuck and the end of the horn, said feed dogs at the end of the horn being spaced so as to have an idle movement to give ample time to place the end cap between the chuck and the end of the horn before the band is fed off from the end of the horn on to the end cap and chuck, means for stripping the assembled band and end cap from the chuck, pivoted retaining means for supporting the end cap in front of the chuck, means movable with the chuck for engaging and moving said pivoted retaining members out of the way so that the end cap may be supported against the end of the horn, a second chuck adapted to enter the band, a flanging die adapted to cooperate with said second chuck in turning the flange on the band on to the end cap, pivoted dogs associated with said flanging die for holding the band in position for the second chuck to enter, said pivoted dogs being constructed so as to be moved out of the way of the chuck by the chuck as it advances into the band.

21. A jar band forming and assembling machine comprising means for forming the bands from a sheet of metal, a horn around which the bands are shaped, means for interlocking the ends of the band while on the horn, means for bumping the interlocked ends, means for moving the bands step by step along the horn, a chuck located directly in front of the end of the horn, means for reciprocating said chuck toward and from said horn and giving a dwell thereto while adjacent the end of the horn so that the band may be moved from the horn on to the chuck, means for placing the end cap between the chuck and the end of the horn prior to the moving of the band on to the chuck, and means for stripping the assembled band and end cap from the chuck.

22. A jar band forming and assembling machine comprising means for forming the bands from a sheet of metal, a horn around which the bands are shaped, means for interlocking the ends of the band while on the horn, means for bumping the interlocked ends, means for moving the bands step by step along the horn, a chuck located directly in front of the end of the horn, means for reciprocating said chuck toward and from said horn and giving a dwell thereto while adjacent the end of the horn so that the band may be moved from the horn on to the chuck, means for placing the end cap between the chuck and the end of the horn prior to the moving of the band on to the chuck, means for stripping the assembled band and end cap from the chuck, a second chuck, a flanging die cooperating with said second chuck, means for supporting the assembled band and end cap for the second chuck to enter whereby the band is moved into the flanging die and the flange turned in the band on to the end cap, and means for stripping the band from said second chuck.

23. A jar band forming and assembling machine comprising means for forming the ends of the band in the sheet, means for severing the formed band from the sheet, a horn, means for bending the severed band about the horn and interlocking the ends thereof, means for bumping the interlocked ends, a presser member bearing on the bands on the horn for controlling the movements of the bands along the horn, means for intermittently moving the bands along the horn, means for placing and supporting an end cap directly in front of the horn including a reciprocating chuck adapted to engage the end cap and support the same against the end of the horn whereby the band as it is fed off from the horn on to the chuck will be fed over the end cap, and means for stripping the assembled band and end cap from the chuck.

24. A jar band forming and assembling machine comprising means for forming the ends of the band in the sheet, means for severing the formed band from the sheet, a horn, means for bending the severed band about the horn and interlocking the ends thereof, means for bumping the interlocked ends, a presser member bearing on the bands on the horn for controlling the movement of the bands along the horn, means for intermittently moving the bands along the horn, means for placing and supporting an end cap directly in front of the horn including a reciprocating chuck adapted to engage the end cap and support the same against the end of the horn whereby the band as it is fed off from the horn on to the chuck will be fed over the end cap, means for stripping the assembled band and end cap from the chuck, a second chuck, a flanging die cooperating with said second chuck, means for supporting the band with the end cap therein in front of the flanging die whereby the second chuck may enter the band and move the same into the flanging die so that a flange is formed in the band bearing against the end cap, and means for stripping the band from the second chuck.

25. A jar band forming and assembling machine comprising means for feeding sheets of metal step by step the width of a band, means for notching the ends of the band in the sheet, means for severing the bands from the sheet after they are notched, means for bending the bands into circular form and for bumping the ends thereof, means for supporting the end cap and for feeding the band after the ends have been bumped together over said end cap, and means for supporting the assembled band and end cap and turning a flange in the band on to the end cap.

26. A jar band forming machine comprising means for feeding a sheet of metal step by step the width of the band, means for notching the sheet to form the ends of the band, means for bending the ends preparatory to the interlocking of the same, a horn, means for severing the bands from the sheet, means for bending the severed bands around the horn and interlocking the ends thereof, and means for bumping down the interlocked ends, means for forming and supporting an end cap at the end of the horn, and means for feeding the band with the ends bumped together off from said horn over said end cap.

27. A jar band forming machine comprising means for feeding a sheet of metal step by step the width of the band, means for notching the sheet to form the ends of the band, means for bending the ends preparatory to the interlocking of the same, a horn, means for severing the bands from the sheet, means for bending the severed bands around the horn and interlocking the ends thereof, means for bumping down the interlocked ends, means for feeding the bands step by step along the horn, a presser member adapted to bear on said bands and hold the same while they are being bumped, and means for raising said presser member to permit the free feeding of the bands.

28. A jar band forming machine comprising means for feeding a sheet of metal step by step the width of the band, means for notching the sheet to form the ends of the band, means for bending the ends preparatory to the interlocking of the same, a horn, means for severing the bands from the sheet, means for bending the severed bands around the horn and interlocking the ends thereof, means for bumping down the interlocked ends, means for feeding the bands step by step along the horn, a presser member adapted to bear on said bands and hold the same while they are being bumped, and means for raising said presser member to permit the free feeding of the bands, said presser member having a yielding section continually bearing on said bands.

In testimony whereof, I affix my signature.

THOMAS L. TALIAFERRO.